US007688729B2

(12) United States Patent
Ooghe et al.

(10) Patent No.: US 7,688,729 B2
(45) Date of Patent: Mar. 30, 2010

(54) RESOURCE ADMISSION CONTROL IN AN ACCESS NETWORK

(75) Inventors: Sven Maurice Joseph Ooghe, Ghent (BE); Ludwig Alice Julienne Pauwels, Beveren (BE)

(73) Assignee: Alcatel, Paris (FR)

( * ) Notice: Subject to any disclaimer, the term of this patent is extended or adjusted under 35 U.S.C. 154(b) by 1202 days.

(21) Appl. No.: 10/612,089

(22) Filed: Jul. 3, 2003

(65) Prior Publication Data
US 2005/0276218 A1 Dec. 15, 2005

(30) Foreign Application Priority Data
Jul. 5, 2002 (EP) ................................. 02291702

(51) Int. Cl.
*H04L 12/26* (2006.01)
(52) U.S. Cl. ................... 370/232; 370/252; 370/437; 370/468
(58) Field of Classification Search ......... 370/229–235, 370/241–253, 395.1, 431, 437, 468
See application file for complete search history.

(56) References Cited

U.S. PATENT DOCUMENTS

| 5,315,586 | A | * | 5/1994 | Charvillat | 370/232 |
| 5,696,764 | A | * | 12/1997 | Soumiya et al. | 370/395.41 |
| 5,734,656 | A | * | 3/1998 | Prince et al. | 370/401 |
| 5,953,338 | A | * | 9/1999 | Ma et al. | 370/395.21 |
| 6,026,091 | A | * | 2/2000 | Christie et al. | 370/395.3 |
| 6,031,840 | A | * | 2/2000 | Christie et al. | 370/410 |
| 6,115,380 | A | * | 9/2000 | Christie et al. | 370/395.3 |
| 6,570,846 | B1 | * | 5/2003 | Ryoo | 370/229 |
| 6,631,133 | B1 | * | 10/2003 | Christie et al. | 370/395.2 |
| 7,239,644 | B2 | * | 7/2007 | Christie et al. | 370/410 |

OTHER PUBLICATIONS

The ATM Form Technical Committee, Traffic Management Specification, Version 4.1, AF-TM-0121.000, Mar. 1999.
The ATM Forum Technical Committee, Customer Network Management (CNM) for ATM Public Network Service (M3 Specification).
RFC 2382—Integrated Services and RSVP over ATM—Aug. 1998—pp. 1-29.

* cited by examiner

*Primary Examiner*—Seema S Rao
*Assistant Examiner*—Mon Cheri S Davenport
(74) *Attorney, Agent, or Firm*—Sughrue Mion, PLLC

(57) ABSTRACT

The present invention is applicable to access networks across which virtual connections have been provisioned to meet traffic and QoS requirements. The present invention improves service integrity by controlling the right for a service instance to use the network resources that have been provisioned for its class of service. Whenever a subscriber requests a service that requires a pre-determined bandwidth with a pre-determined QoS, one checks whether the virtual connection over which the service will be delivered to the subscriber can convey the required bandwidth with the required QoS. According to the check outcome, the service is granted or denied to the subscriber. The present invention may further improve the usage of the network resources. This second object is achieved by adapting the configuration of the access network according to the real traffic demand.

8 Claims, 2 Drawing Sheets

RESOURCE ADMISSION CONTROL IN AN ACCESS NETWORK

BACKGROUND OF THE INVENTION

The present invention relates to a method to guarantee for a service a bandwidth across an access network with a quality of service, and to an access network wherein the method is applied.

Such a method is already known in the art, e.g. from the document entitled '*Traffic Management Specification*', published by the ATM forum technical committee on March 1999, version 4.1, reference AF-TM-0121.000. Therein, a method to achieve performance objectives in an Asynchronous Transfer Mode (ATM) network and to protect the network from traffic congestion is described.

An access network is that part of a data communications network that connects the subscribers to the core network. The access network may overlay upon an established network such as the Public Switched Telephone Network (PSTN), typically upon the last few miles of the PSTN to serve thinly scattered residential subscribers. The trade-off is to get the highest traffic concentration ratios across the access network, i.e. less equipment and less leased lines, while guaranteeing the best network performances to the subscribers.

ATM is a candidate technology for the transport layer between the subscriber and the core network. ATM is a connection-oriented cell-based transport technique and is intended to support a wide variety of services and applications. At the subscriber premises, a Data Communication Equipment (DCE) chops the upstream traffic from a Data Terminal Equipment (DTE) into data blocks, encapsulates the data blocks into ATM cells and transmits the ATM cells over the User Network Interface (UNI). The ATM cells are transported over a virtual connection, which is set up across the access network between the DCE and an edge node of the access network coupled to the core network. The edge node extracts the upstream traffic from the ATM cells and transmits it over the core network. In the reverse direction, the edge node encapsulates the downstream traffic from the core network into ATM cells and transmits them over the appropriate virtual connection. The edge node could also stand for:
  a network element of the access network that is coupled to the PSTN, such as a voice gateway,
  a network element of the access network that houses a service provider or that is coupled via a Local Area Network (LAN) to a service provider,
or any alternative as known to the skilled person.
  ATM defines a two-level hierarchical connection scheme:
  the Virtual Channel (VC) is a connection between two end systems for a specific service or application,
  the Virtual Path (VP) is a connection between two network nodes that transports a large number of simultaneous VCs.

A connection can be initiated by any of the two end systems involved in the connection or can be provisioned by a third party, such as a network manager. In the latter case, the connection is referred to as Permanent Virtual Channel (PVC) or Permanent Virtual Path (PVP).

The connection-oriented mode of operation allows the network to check whether enough resources are available for a connection and then to commit some Quality of Service (QoS) for that connection. The bandwidth and the QoS required for a connection are negotiated at connection establishment time. The network can reserve therefrom the appropriate resources for this connection. The network guarantees that the congestion of the network resources will only occur with a very low pre-determined probability.

An object of the known method is to meet bandwidth and QoS requirements across an ATM network. Another object is to promote the efficient use of the network resources.

In a preliminary step of the known method, a set of parameters is defined for describing the bandwidth and the QoS requirements.

The bandwidth requirements are expressed by means of traffic descriptors featuring the way a source may transmit cells over the network. The Peak Cell Rate (PCR) defines the maximum cell rate a source may reach. In case of fluctuating cell rate (e.g., because of a video compression algorithm), additional descriptors might be specified to allow the network to allocate resources more efficiently.

The quality of service of a connection relates to the cell loss, the delay and the delay variation (also called jitter) incurred by the cells transferred over the connection.

Thereupon, appropriately differentiated service categories are defined. Whenever a connection is set up, the service category to which that connection relates and the traffic and QoS parameters relevant to that service category are specified.

The ATM service categories are:
  Unspecified Bit Rate (UBR) service category,
  Constant Bit Rate (CBR) service category,
  real time—Variable Bit Rate (rt-VBR) service category,
  non-real time—Variable Bit Rate (nrt-VBR) service category,
  Available Bit Rate (ABR) service category,
  Guaranteed Frame Rate (GFR) service category.

The UBR service category is intended for non-real time best effort applications, such as internet browsing, file transfer or e-mail.

The CBR service category is used by connections that request a static amount of bandwidth that is continuously available during the connection lifetime. This amount of bandwidth is characterized by the PCR value. The source may emit cells at or below the negotiated PCR (and may also even be silent) at any time and for any duration and the QoS commitments still pertain. CBR service is intended for real time applications requiring tightly constrained delay, delay variation and cell loss ratio, such as video streaming or Voice over IP (VoIP).

Refer to the above mentioned specification for further details about the remaining service categories and the set of parameters relevant to each category.

In a further step of the known method, mechanisms are specified for managing and controlling traffic and congestion in ATM networks. These mechanisms are:
  Connection Admission Control (CAC), which is defined as the set of actions taken by the network during the connection set up phase to determine whether a connection request can be progressed or should be rejected according to the network resources that remain available for that connection,
  Usage Parameter Control (UPC), which is defined as the set of actions taken by the network to monitor and, possibly, to enforce the traffic contract at the UNI,
  Network Parameter Control (NPC), which is defined as the set of actions taken by the network to monitor and, possibly, to enforce the traffic contract at the Network Node Interface (NNI),
  Feedback control, which is defined as the set of actions taken by the network and by the end-systems to adjust the traffic submitted on a ATM connection according to the state of the network elements along that connection, Cell Loss Priority (CLP) control, which allows the network to discard some lower priority cells to protect, as far as possible, the QoS objectives of higher priority cells, Traffic Shaping, used to achieve a desired modification to the traffic characteristics of a connection.

The main objective of the UPC and NPC policers is to protect the network resources from malicious, as well as unintentional misbehaviour, which can affect the QoS of other established connections. This protection is achieved by detecting violations of the negotiated traffic parameters and by taking appropriate actions, such as discarding cells.

Most of the ATM based access networks make use of PVCs to connect a subscriber's DCE to an edge node of the access network. As a matter of fact, the installed base of subscriber's DCEs are for the most part unable to set up an ATM connection on their own. They miss important ATM features (no signalling channel, etc) as well as the necessary pieces of information (no ATM addressing data, etc).

A subscriber is provisioned with as many PVCs as there are classes of service to support for that subscriber. Each PVC is assigned a suitable service category in accordance with the known method.

A shortcoming of the know method is the very loose integration between those PVCs overlaying upon the access network and adapted to transport an amount of traffic across the access network with a QoS, and the higher communication layers submitting traffic thereto. The traffic submitted over a virtual connection does not necessarily need to conform to the ATM traffic contract of that virtual connection. If the real traffic load goes beyond the provisioned bandwidth, a UPC or NPC policer will start discarding ATM cells irrespective of the service to which the ATM cells relate. Consequently, delivering a new service over a connection without any further check may alter the integrity of existing services delivered over that connection.

BRIEF SUMMARY OF THE INVENTION

An object of the present invention is to improve service integrity by controlling the right for a service instance to use the network resources that have been provisioned for its class of service.

According to the invention, this object is achieved by the method and by the access network.

Whenever a subscriber requests a service that requires a pre-determined bandwidth across an access network with a pre-determined QoS, the service is granted or denied according to the resources of the access network that remain available to deliver said service to said subscriber with said quality of service.

First of all, the virtual connection(s) that has been provisioned across the access network for that class of service and that subscriber is identified. The identification step comprises the steps of:

identifying the edge node of the access network through which said service is delivered to said subscriber, translating the data transfer capabilities, as required by said service with respect to the data communication network, into data transfer capabilities, as required by said service with respect to the access network, retrieving the configuration of the access network, identifying which one(s) of the virtual connections that have been provisioned between said subscriber and the so-identified edge node supports the so-translated data transfer capabilities, Next, one checks whether the so-identified virtual connection(s) can convey the required bandwidth with the required QoS while maintaining the QoS agreed with the services already sharing that virtual connection, According to the check outcome, said subscriber is granted or denied said service.

By checking upon service request whether an access network can accommodate an additional amount of traffic, one can further overcome the over provisioning of the network resources. In the known method, the bandwidth and the service category of a PVC is determined from a service level agreement between the subscriber and the operator. A PVC is allocated the necessary network resources to convey at any time and for any duration the traffic volume agreed with the subscriber and committed upon by the operator, even though that PVC might not be active, i.e. might not convey any traffic. An alternative would be to define only UBR PVCs, as prevailing in most of the access networks. However, the UBR PVCs are intended for best effort traffic and thus are helpless for network applications that requires QoS commitments for the data transferred across the access network.

Several embodiments can be thought off that realizes the optimization of the network resources in an access network across which virtual connections have been provisioned to meet traffic and QoS requirements, while still improving the integrity of the services delivered over those virtual connections.

Three of them are defined in the following embodiments.

In the first embodiment, one adapts the capacity of the so-identified virtual connection for it to convey the required bandwidth with the required QoS, provided there are enough resources available in the access network to do so, or alternatively provided the CAC of the network elements across which the virtual connection is established grants the permission to do so. One can either provision a suitable bandwidth for that virtual connection or set the policer parameters to allow more cells to cross the UNI and the NNI. By fitting closer to the real traffic demand, one can transport more traffic across the access network than one could if the virtual connections were left as provisioned initially.

In the second and third embodiments, a path is provisioned across the access network, over which a number of virtual connections are multiplexed. The path is provisioned between the node whereto the subscribers are connected and the edge node, or between any intermediate nodes.

A path stands for any amount of bandwidth that connects a network element of the access network to another. It could simply be a physical connection link or a logical partition thereof. It could also be a path transparently cross-connected across the access network, such as a PVP in an ATM network.

The bandwidth provisioned for the path is determined from an expected traffic load. The sum of the bandwidths provisioned for each virtual connection may exceed the bandwidth provisioned for the path, thereby introducing a non-null probability for a virtual connection not getting the bandwidth it has been provisioned for.

The multiplexing can be manifold:

in the second embodiment, the virtual connections are aggregated one with each other over the path, the CAC means being preliminarily disabled so as to aggregate more virtual connections than there are bandwidth available, in the third embodiment, a virtual connection is dynamically connected to the path when the first service to be delivered over that connection is granted, and dynamically disconnected when the last granted service is completed.

In both embodiments, one further identifies the path over which the so-identified virtual connection is multiplexed, next one checks whether the so-identified path can convey the required bandwidth with the required QoS while maintaining the QoS agreed with the subscribers already sharing that path. This additional checking step is a requisite for preserving the integrity of the services delivered over the path.

In another characterizing embodiment of the present invention, the bandwidth provisioned for the path is determined according to a statistical traffic law, given a number of virtual connections multiplexed over the path, an estimated or measured traffic load per user and a service deny probability. The way around, a path may also get a pre-determined bandwidth, such as the one enforced by a physical link. Then, the number of virtual connections that are multiplexed over the path is determined according to a traffic law, given that pre-determined available bandwidth, an estimated or measured traffic load per user and a service deny probability. The traffic law could be for instance the Erlang law, assuming a Poisson distribution of the network usage over the subscribers.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF EXEMPLARY EMBODIMENTS OF THE INVENTION

In a preferred embodiment of the present invention, the access network ACCESS is an ATM based data communication network that connects a plurality of subscribers USR1 to USRN to a core network CORE. The core network CORE is part of an IP based data communication network, such as the Internet.

The access network ACCESS comprises the following distinctive network elements:
an access node ANOD,
an edge node ENOD.
The access network ACCESS further comprises:
an access resource controller ARC,
a network manager NM.
The subscribers USR1 to USRN are coupled to the access node ANOD. At respective ones of the subscriber premises, for instance at USRi with i being an integer from 1 to N, a DTE TERMi, such as a personal computer, is coupled to a DCE MODEMi, such as a Digital Subscriber Line (DSL) modem. The DCE MODEMi is coupled via a transmission line, such as an unshielded twisted copper conductor pair, to the access node ANOD.

The access node ANOD is coupled to the edge nodes ENOD. The edge nodes ENOD is coupled to the core network CORE, so is the access resource controller ARC. The network manager NM is coupled to network elements of the access network ACCESS, including—but not restricted to—the network elements ANOD and ENOD.

The access node ANOD accommodates the protocol suites applicable to the traffic planes, the signalling planes and the management planes terminating at or relayed across any of its physical ports, as well as all the necessary hardware components for those planes to operate.

Figure 1:
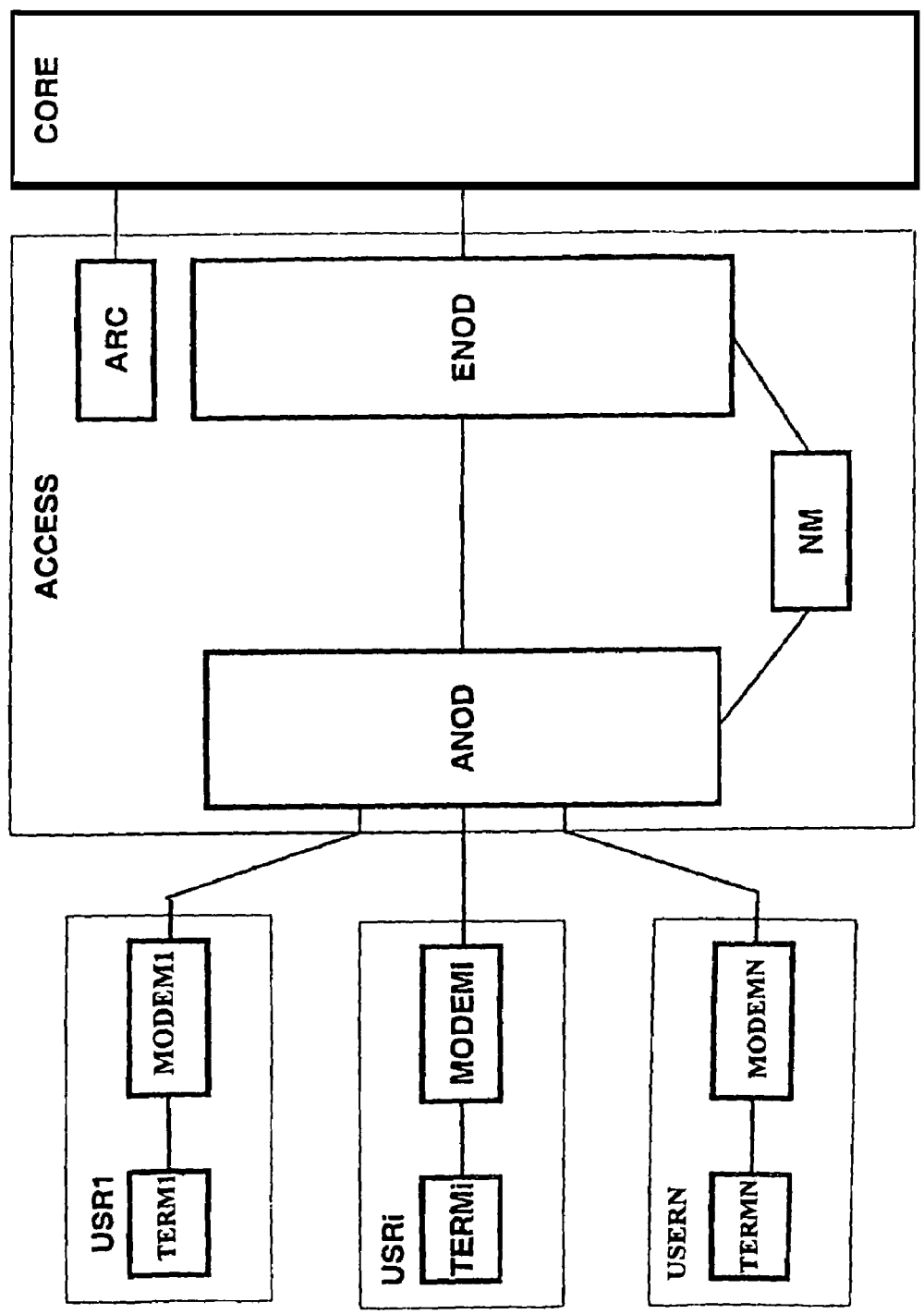
FIG. 1 represents an access network ACCESS according to the invention.

More specifically and with respect to the scope of the present invention, the access node ANOD accommodates a plurality of physical Input/Output (I/O) ports adapted to terminate an electrical signal of a subscriber line, such as a DSL signal, and a plurality of physical I/O ports adapted to terminate an electrical or optical signal from a network element of the access network ACCESS, such as an optical STM-1 signal. The access node ANOD comprises an ATM switch fabric to switch ATM cells from any incoming ATM virtual channel to any outgoing ATM virtual channel. The access node ANOD accommodates the necessary queuing means on the ATM egress ports. To meet ATM QoS requirements, the access node ANOD implements a suitable cell scheduling policy in association with ATM traffic management functions, including—but not restricted to—CAC, UPC, NPC and CLP. The access node ANOD houses an agent to carry out management operations upon request from the network manager NM. As an example, the access node may be requested to provision a PVC with a given bandwidth and a given QoS on any ATM port. None of these components is shown in FIG. 1 for reasons of readability.

The access node ANOD could be for instance a Digital Subscriber Line Access Multiplexer (DSLAM).

The edge node ENOD accommodates the protocol suites applicable to the traffic planes, the signalling planes and the management planes terminating at or relayed across any of its physical ports, as well as all the necessary hardware components for those planes to operate.

More specifically, the edge node ENOD accommodates a plurality of physical I/O ports adapted to terminate an electrical or optical signal from a network element of the access network ACCESS, and a plurality of physical I/O ports adapted to terminate an electrical or optical signal from a network element of the core network CORE, such as a 1 Gigabit Ethernet signal. The edge node ENOD is adapted to extract the IP traffic from an incoming ATM virtual channel and to forward it to the core network CORE, and vice-versa. Traffic forwarding is achieved by maintaining on a per subscriber session basis a cross-reference table associating the identifier of an ATM virtual channel with the IP address of the subscriber to which that virtual channel relates. Traffic forwarding could possibly rely upon Protocol Control Information (PCI) of the data packets. The edge node ENOD accommodates the necessary queuing means on the ATM egress ports. To meet ATM QoS requirements, the edge node ENOD implements a suitable cell scheduling policy in association with ATM traffic management functions, including—but not restricted to—CAC, NPC and CLP. The edge node ENOD is adapted to terminate a subscriber point-to-point dial-in session, such as a PPPoE session, which is established across the access network ACCESS over an ATM virtual channel. The edge node ENOD accommodates Authentication Authorization and Accounting (AAA) means, directly or through a dedicated server. The edge node ENOD may further accommodate firewall means, caching means, etc. The edge node ENOD houses an agent to carry out management operations upon request from the network manager NM. None of these components is shown in FIG. 1 for reasons of readability.

The edge node ENOD could be for instance a Broadband Access Server (BAS).

The access resource controller ARC is a computing station comprising a Pentium III processor supplied by Intel Corp, as well as all the necessary hardware as known to the skilled person, such as random access memory, a hard disk, an interruption controller, a DMA controller, a graphic card, I/O peripherals.

The access resource controller ARC implements a Bandwidth on Demand (BoD) interface across which a service provider requests for a subscriber a pre-determined bandwidth across the access network ACCESS with a pre-determined QoS. The required bandwidth is granted for a period of time, the value of which being specified by the service provider. The required bandwidth and the required QoS are both specified with respect to the IP data communication network. The required bandwidth is defined as the upper bound of the IP throughput required to deliver the service to the subscriber. The required QoS is defined as the IP class of service to which the service relates, such as the differentiated service code point. Quantified objectives may further be specified for the packet loss ratio, the packet delay and the packet jitter.

The access resource controller ARC is adapted to:
communicate via the core network CORE with service providers, by implementing the appropriate IP protocol suite,
retrieve the configuration data of the access network ACCESS,
identify the resources of the access network ACCESS that have been provisioned for a class of service and for a subscriber,
maintain bandwidth counter on a per ATM connection basis, each bandwidth counter holding the value of the bandwidth that remains available for a connection,
check whether an ATM connection can convey a required bandwidth with a required QoS.

The network manager NM of the access network ACCESS is a computing station, such as one of the above mentioned type.

The network manager NM accommodates the protocol suite applicable on the interface between the network manager NM and the network agents, such as the Q.3 protocol suite. The network manager NM makes use of a Management Information Base (MIB) abstracting the resources of the access network ACCESS into managed objects and defining the management operations those managed objects may support. Dealing with the present invention, the network manager NM is adapted to provision a given bandwidth across the access network ACCESS with a given QoS, being a PVC or a PVP, by issuing the appropriate management commands to the appropriate agents.

The subscribers USR1 to USRN are committed a service level agreement, which includes a guaranteed IP throughput for streaming application such as radio or video broadcasting. A service deny probability is mentioned therein, notifying the subscriber that he might not get the committed bandwidth with a pre-determined probability.

Thereupon, PVCs with suitable ATM service categories are configured between the subscribers USR1 to USRN and the edge node ENOD. In the preferred embodiment, each subscriber is supplied with a UBR PVC for best effort traffic and a CBR PVC for real-time traffic. The PCR of the CBR PVCs is determined from the committed IP throughput by including the overhead introduced by the access network ACCESS, such as PPPoE overhead, and by translating the resulting throughput into ATM cell rate.

The forwarding of the traffic onto the right PVC is out of the scope of the present invention. An algorithm based upon the class of service to which the data packets relate is one possible solution, out of a number of valid alternatives as known to the skilled person. The traffic bifurcation is performed in the subscriber's DCE MODEMi for the upstream traffic, and in the edge node ENOD for the downstream traffic.

The network manager NM requests the agents of the access node ANOD and the edge node ENOD to:
provision N UBR PVCs U11 to U1N between respective ones of the subscriber's DCEs MODEM1 to MODEMN and the access node ANOD,
provision N UBR PVCs U21 to U2N between the access node ANOD and the edge node ENOD,
connect the N PVCs U11 to U1N with respective ones of the N PVCs U21 to U2N, thereby providing N end-to-end UBR connections U1 to UN between respective ones of the subscribers USR1 to USRN and the edge node ENOD,
provision N CBR PVCs C11 to C1N between respective ones of the subscriber's DCEs MODEM1 to MODEMN and the access node ANOD,
provision N CBR PVCs C21 to C2N between the access node ANOD and the edge node ENOD,
connect the N PVCs C11 to C1N with respective ones of the N PVCs C21 to C2N, thereby providing N end-to-end CBR connections C1 to CN between respective ones of the subscribers USR1 to USRN and the edge node ENOD,
provision a CBR PVP C between the access node ANOD and the edge node ENOD, the bandwidth of which being determined from the real-time traffic expected for the subscribers USR1 to USRN,
disable the CAC means on the ports of the access node ANOD where the PVP C has been provisioned,
disable the CAC means on the ports of the edge node ENOD where the PVP C has been provisioned,
aggregate the N PVCs C1 to CN over the PVP C.

Figure 2:
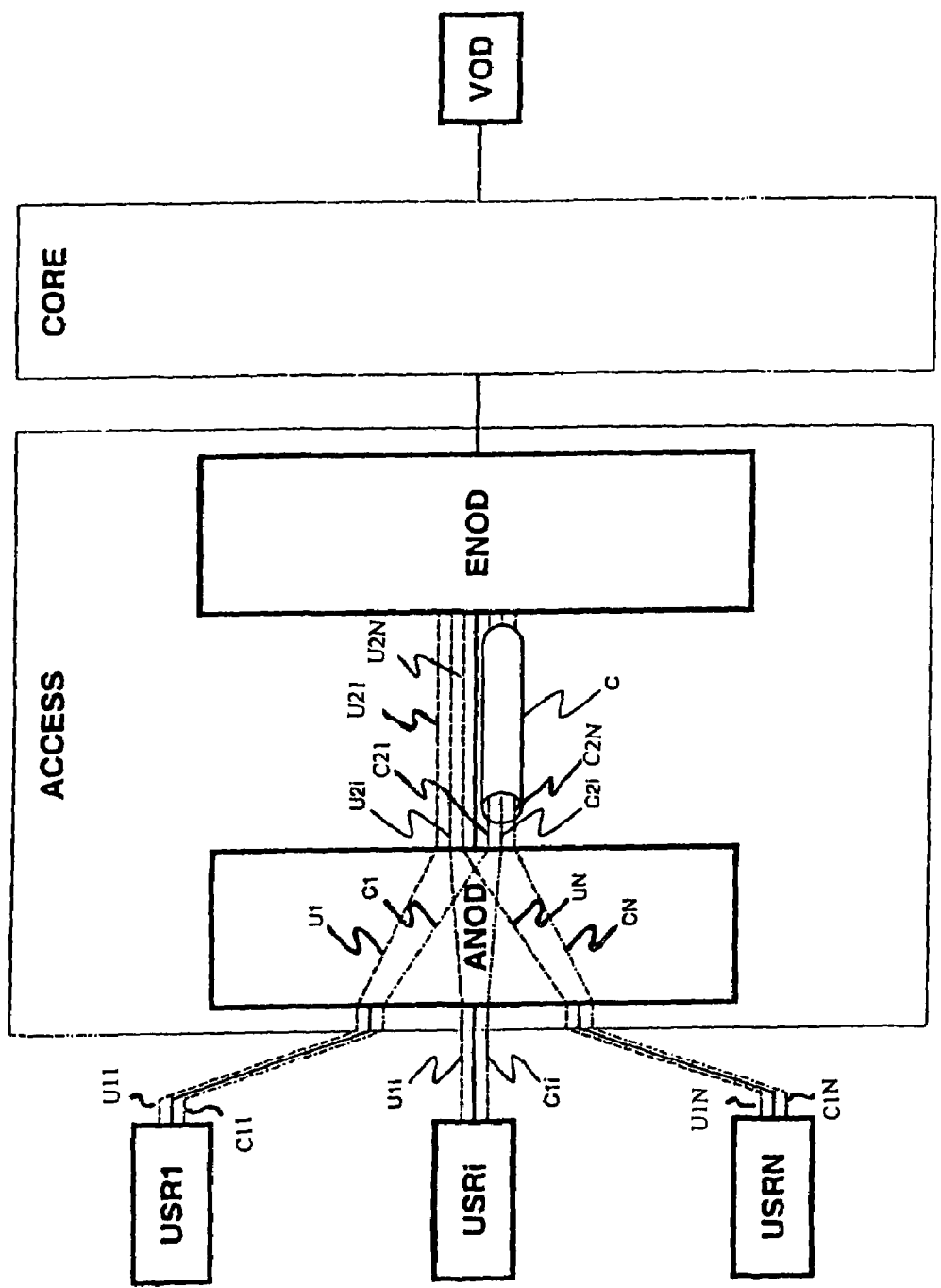
FIG. 2 represents the virtual connections provisioned across the access network ACCESS to deliver video on demand with a guaranteed QoS.

Only a few connections are shown in the FIG. 2 in order to not overload the drawing.

The PCR to be provisioned for the PVP C is derived from the Erlang B formula. This formula is used to calculate the Flow Blocking Probability (FBP) of a multiplexing device:

$$FBP(n, \rho, m) = \frac{(n \cdot \rho)^m / m!}{\sum_{i=0}^{m} (n \cdot \rho)^i / i!}$$

In this formula, n denotes the number of inputs of said multiplexing device, m denotes the number of outputs and $\rho$ denotes the mean load at the n inputs. $\rho$ is comprised between 0 (an input is never used) and 1 (an input is always used). The multiplexing ratio of said multiplexing device is n/m.

The value of m is calculated with fixed values of n and $\rho$ and a desired FBP. A typical value for the desired FBP is $10^{-4}$, a typical value for $\rho$ is $10^{-1}$. The calculation process makes use of an iterative process, calculating the value of FBP for increasing values of m, until the value for FBP obtained using the Erlang B formula is smaller than the desired FBP.

The aggregation of the PVCs C1 to CN over the PVP C can be assimilated to such a multiplexing device wherein:

n=N,

FBP is the above mentioned service deny probability, the PCR of the PVP C is m times the PCR of the PVC Ci.

Following the request from the network manager NM, the agents of the access node ANOD and the edge node ENOD carry out resource assignment and connection activation. At that stage, the pre-configuration of the access network ACCESS is completed in conformance with the present invention.

The configuration data of the access network ACCESS are encoded in a file, which is subsequently loaded into the access resource controller ARC by means of a floppy disk.

In the following, the operation of the preferred embodiment will be described by reference to a service provider VOD coupled to the core network CORE and delivering to the subscribers USR1 to USRN videos on demand.

A subscriber USRi requests a video V to the service provider VOD via the UBR connection Ui and next via the core network CORE.

The video V requires a bandwidth B_IP with a QoS Q_IP for a period of time T. The service provider VOD requests the access resource controller ARC via the core network CORE whether it can be granted those resources for the subscriber USRi.

First of all, the access resource controller ARC translates the IP data transfer capabilities as required by the service provider VOD into ATM data transfer capabilities. B_IP is translated into B_ATM by including the overhead introduced by the access network ACCESS and by translating the resulting throughput into ATM cell rate. Q_IP is translated into Q_ATM by matching the IP class of service required by the service provider with a suitable ATM service category, possibly assigning values to the cell loss, cell delay and cell jitter objectives.

The access resource controller ARC retrieves the configuration of the access network ACCESS and identifies the PVC Ci as being capable of conveying the required bandwidth B_ATM with the required QoS Q_ATM between the edge node ENOD and the subscriber USRi. Next, the access resource controller ARC looks for any contention point in the access network that may narrow the original bandwidth. The access resource controller ARC identifies the PVP C as such.

A set of counters hold the value of the bandwidth that remains available for the PVCs C1 to CN and for the PVP C. These counters are decremented whenever bandwidth is granted to a service provider and incremented when the resources are released.

The access resource controller ARC checks whether the counter related to the PVC Ci and the PVP C are both greater or equal than B_ATM. If so, the bandwidth is granted and both counters are decremented accordingly. A timer is set to T seconds and started therefrom. Upon timer expiry, both counter are incremented back to their original value.

Eventually, the access resource controller ARC grants or denies the required bandwidth to the service provider VOD via the core network CORE, which in turns grants or denies the video V to the subscriber USRi via the core network CORE and next via the UBR connection Ui.

If the service is granted, the ordered video V starts being broadcasted to the subscriber USRi. The video data packets are flagged with a suitable class of service value and are transmitted over the core network CORE. The data packets are routed through the core network CORE up to the edge node ENOD, wherein they are encapsulated into ATM cells and delivered over the CBR connection Ci to the subscriber USRi.

In the preferred embodiment, the same bandwidth is provisioned for the upstream and downstream traffic. ATM support asymmetric connection wherein the PCR specified for the egress direction is distinct from the PCR specified for the ingress direction. Such a feature could be helpful for an Asymmetric Digital Subscriber Line (ADSL) access wherein the upstream traffic is allocated a lower bandwidth on the subscriber line portion than the downstream traffic is. The reservation and the supervision of the resources would then be instantiated on a per traffic flow direction basis.

In an alternative embodiment of the present invention, the access resource controller ARC would be coupled to the network manager NM to retrieve the configuration of the access network ACCESS. The access resource controller ARC may load the configuration of the access network ACCESS from the network manager NM via a M3 interface, as defined in the document entitled '*Customer Network Management for ATM Public network Service (M3 Specification)*', published by the ATM forum technical committee on October 1994, revision 1.04, reference AF-NM-0019.000. The access resource controller could also dump a file, e.g. through an FTAM session, wherein the configuration of the access network ACCESS has been encoded according to a proprietary-format.

In an alternative embodiment of the present invention, the access resource controller ARC would be coupled to the access node ANOD and to the edge node ENOD to read local performance counters. The access node ANOD and the edge node ENOD would implement counters measuring the occupied bandwidth on a per ATM connection basis. Upon bandwidth request, the access resource controller ARC would check whether a PVC or a PVP can convey the required bandwidth by reading the real-time value of the corresponding counters and by checking whether the PVC or the PVP can further accommodate the additional bandwidth. In so doing, the access resource controller does not need to maintain any counter or any timer on its own.

In an alternative embodiment of the present invention, PVCs with other ATM service categories would be provisioned, such as rt-VBR or ABR service category. The bandwidth required via the BoD interface would further include additional parameters along with the maximum IP throughput, such as the mean IP throughput or the minimum required IP throughput. In so doing, the access resource controller ARC would reserve the network resources more efficiently by relying on the statistical averaging of non-correlated traffic flows aggregated to each other.

A person skilled in the art could consider any other label switched technology than ATM, such as MPLS or frame relay technology, as a valid alternative for the transport layer in the access network ACCESS.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method to deliver across an access network a data stream requiring a bandwidth and a quality of service, said method comprising:

provisioning a plurality of virtual connections capable of meeting bandwidth and quality of service requirements between a user, among a plurality of users coupled to said access network, and an access server of said access network coupled to a content provider operable to deliver said data stream, wherein the provisioned virtual connections are specific to the user; and requesting, by the user, said data stream from said content provider after said provisioning of the plurality of virtual connections to the user, wherein after the user has requested said data stream from said content provider, and if the user lacks support for negotiating or acknowledging the bandwidth through said access network with said quality of service, said method further comprises:

identifying a virtual connection out of said plurality of provisioned virtual connections capable of guaranteeing said quality of service between said user and said access server;

checking whether said virtual connection can convey said bandwidth; and according to the outcome of said checking whether said virtual connection can convey said bandwidth, allowing or disallowing said data stream to be delivered over said virtual connection to said user, the method further comprising:

provisioning a virtual path across said access network, the bandwidth of which being determined from a traffic load expected from said plurality of users;

aggregating said plurality of virtual connections over said virtual path;

disabling any connection admission control means in said access network that may prevent the aggregating said plurality of virtual connections over said virtual path;

if said virtual connection conveys said bandwidth, checking additionally whether said virtual path conveys said bandwidth; and according to the outcome of said additional checking step, allowing or disallowing said data stream to be delivered over said virtual connection to said user.

2. The method according to claim 1, further comprising:

if said virtual connection cannot convey said bandwidth, checking additionally whether said access network can accommodate said bandwidth between said user and said access server along said virtual connection; and according to the outcome of said additional checking:

adapting the capacity of said virtual connection for it to convey said bandwidth and allowing said data stream to be delivered to said user, or disallowing said data stream to be delivered to said user.

3. A method according to claim 1, further comprising:

if said virtual connection can convey said bandwidth, checking additionally whether said virtual path can convey said bandwidth; and according to the outcome of said additional checking:

connecting said virtual connection to said virtual path and allowing said data stream to be delivered to said user, or disallowing said data stream to be delivered to said user.

4. The method according to claim 1, wherein the bandwidth of said virtual path is determined according to a statistical traffic law, given a number of virtual connections multiplexed over said virtual path, a traffic load per user and a service deny probability.

5. The method according to claim 1, wherein the number of virtual connections multiplexed over said virtual path is determined according to a statistical traffic law, given a bandwidth of said virtual path, a traffic load per user and a service deny probability.

6. An access network operable to convey a data stream requiring a bandwidth and a quality of service, said access network comprising;

an access server coupled to a content provider operable to deliver said data stream;

administration means for provisioning a plurality of virtual connections capable of meeting bandwidth and quality of service requirements between a user, among a plurality of users coupled to said access network, and the access server, wherein the provisioned virtual connections are specific to the user; and access resource control means for, after the user has requested said data stream from said content provider, and if said user lacks support for negotiating or acknowledging through said access network said bandwidth with said quality of service, identifying a virtual connection out of said plurality of provisioned virtual connections capable of guaranteeing said quality of service between said user and said access server, checking whether said virtual connection can convey said bandwidth, according to the outcome of said check, allowing or disallowing said data stream to be delivered over said virtual connection to said user, wherein said administration means provisions the plurality of virtual connections to the user before said user requests the data stream, and wherein said administration means:

provisions a virtual path across said access network, the bandwidth of which being determined from a traffic load expected from said plurality of users;

aggregates said plurality of virtual connections over said virtual path; and disables any connection admission control means in said access network that may prevent from aggregating said plurality of virtual connections over said virtual path, and wherein said access resource control means:

if said virtual connection conveys said bandwidth, checks additionally whether said virtual path conveys said bandwidth, according to the outcome of said additional check, allows or disallows said data stream to be delivered to said user.

7. The access network according to claim 6, wherein said access resource control means are coupled to said administration means, wherein said administration means adapts the capacity of said virtual connection, and wherein said access resource control means:

if said virtual connection cannot convey said bandwidth, checks additionally whether said access network can accommodate said bandwidth between said user and said access server; and according to the outcome of said additional check:

triggers said administration means to adapt the capacity of said virtual connection for it to convey said bandwidth and allow said data stream to be delivered over said virtual connection to said user, or disallows said data stream to be delivered to said user.

8. The access network according to claim 6, wherein said access resource control means are coupled to said administration means, and said administration means:

connects said virtual connections to said virtual path, and wherein said access resource control means:

if said virtual connection can convey said bandwidth, checks additionally whether said virtual path can convey said bandwidth; and according to the outcome of said additional checking step:

triggers said administration means to connect said virtual connection to said virtual path and allow said data stream to be delivered to said user, or disallows said data stream to be delivered to said user.

* * * * *